US009686665B2

(12) United States Patent
Igumnov et al.

(10) Patent No.: US 9,686,665 B2
(45) Date of Patent: Jun. 20, 2017

(54) METHOD AND APPARATUS FOR DYNAMIC LOCATION-BASED GROUP FORMATION USING VARIABLE DISTANCE PARAMETERS

(71) Applicant: MOTOROLA SOLUTIONS, INC, Schaumburg, IL (US)

(72) Inventors: Alexei Vladimirovich Igumnov, St. Petersburg (RU); Fedor Grigorievich Saveliev, St. Petersburg (RU)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/114,412

(22) PCT Filed: Mar. 24, 2014

(86) PCT No.: PCT/RU2014/000187
§ 371 (c)(1),
(2) Date: Jul. 27, 2016

(87) PCT Pub. No.: WO2015/147671
PCT Pub. Date: Oct. 1, 2015

(65) Prior Publication Data
US 2017/0006448 A1    Jan. 5, 2017

(51) Int. Cl.
*H04M 11/04*  (2006.01)
*H04W 4/22*  (2009.01)
(Continued)

(52) U.S. Cl.
CPC ............. *H04W 4/22* (2013.01); *H04W 4/022* (2013.01); *H04W 4/046* (2013.01); *H04W 4/08* (2013.01);
(Continued)

(58) Field of Classification Search
CPC ....... H04W 4/22; H04W 4/022; H04W 4/046; H04W 4/08; H04W 4/10; H04W 4/028; H04W 76/005; H04W 76/007
See application file for complete search history.

(56) References Cited

U.S. PATENT DOCUMENTS 7,644,144 B1    1/2010   Horvitz et al.
8,244,291 B2    8/2012   Jorgensen
(Continued)

FOREIGN PATENT DOCUMENTS

WO    2010140907 A1    12/2010
WO    2012149294 A1    11/2012

OTHER PUBLICATIONS

The International Search Report and the Written Opinion, SN: PCT/RU2014/000185, filed: Mar. 24, 2014, mailed: Dec. 1, 2014, all pages.

*Primary Examiner* — Barry Taylor

(57) ABSTRACT

Dynamic group formation in a wireless radio communication system including a plurality of subscriber units is implemented using variable distance parameters. First, a request for a new group call relative to a defined location is received at a controller from a requesting device. A current location of each of a plurality of potential responding second subscriber units is determined. A maximum response distance associated with each of the second subscriber units is determined as a function of a stored mode of transport associated with each of the second subscriber units. A group is formed including second subscriber units having current locations that fall within the maximum response distance relative to the defined location associated with that second subscriber unit. Audio or data transmitted by the requesting device is then caused to be provided to the second subscriber units in the formed group.

20 Claims, 7 Drawing Sheets

(51) Int. Cl.
*H04W 4/04* (2009.01)
*H04W 4/08* (2009.01)
*H04W 4/10* (2009.01)
*H04W 4/02* (2009.01)
*H04W 76/00* (2009.01)

(52) U.S. Cl.
CPC .............. *H04W 4/10* (2013.01); *H04W 4/028* (2013.01); *H04W 76/005* (2013.01); *H04W 76/007* (2013.01)

(56) References Cited

U.S. PATENT DOCUMENTS

| | | | |
|---|---|---|---|
| 8,483,651 B1 | 7/2013 | Zamora et al. | |
| 9,167,379 B1 * | 10/2015 | Hamilton | H04W 4/02 |
| 2005/0113123 A1 | 5/2005 | Torvinen | |
| 2005/0186970 A1 * | 8/2005 | Yates | H04W 4/10 |
| | | | 455/456.5 |
| 2005/0222752 A1 | 10/2005 | Sokola et al. | |
| 2005/0233776 A1 | 10/2005 | Allen et al. | |
| 2007/0036118 A1 * | 2/2007 | Shaffer | H04W 4/08 |
| | | | 370/338 |
| 2007/0202908 A1 | 8/2007 | Shaffer et al. | |
| 2007/0208492 A1 | 9/2007 | Downs et al. | |
| 2007/0239824 A1 | 10/2007 | Shaffer et al. | |
| 2009/0054077 A1 | 2/2009 | Gauthier et al. | |
| 2009/0264106 A1 | 10/2009 | Mo et al. | |
| 2011/0117878 A1 * | 5/2011 | Barash | G08B 21/0211 |
| | | | 455/404.2 |
| 2012/0209517 A1 | 8/2012 | Li et al. | |
| 2012/0225636 A1 | 9/2012 | Ernst et al. | |
| 2012/0265867 A1 | 10/2012 | Boucher et al. | |
| 2013/0065628 A1 * | 3/2013 | Pfeffer | G08B 25/006 |
| | | | 455/521 |
| 2013/0271324 A1 | 10/2013 | Sendonaris et al. | |
| 2014/0057645 A1 | 2/2014 | Chowdhary et al. | |
| 2014/0213295 A1 * | 7/2014 | Conklin | H04W 4/021 |
| | | | 455/456.2 |

* cited by examiner

METHOD AND APPARATUS FOR DYNAMIC LOCATION-BASED GROUP FORMATION USING VARIABLE DISTANCE PARAMETERS

This application is a National Stage filing under 35 USC §371 of co-pending Patent Cooperation Treaty international application having Serial No. PCT/RU2014/000187 (the 'PCT international application') filed on Mar. 24, 2014. This application claims priority to the PCT international application, the entire contents of which are incorporated herein by reference.

BACKGROUND OF THE INVENTION

Radio access networks (RANs) provide for radio communication links to be arranged within the network between a plurality of user terminals. Such user terminals may be mobile and may be known as 'mobile stations' or 'subscriber units.' At least one other terminal, e.g. used in conjunction with subscriber units (SUs), may be a fixed terminal, e.g. a base station, eNodeB, repeater, and/or access point. Such a RAN typically includes a system infrastructure that generally includes a network of various fixed terminals, which are in direct radio communication with the SUs. Each of the fixed terminals operating in the RAN may have one or more transceivers which may, for example, serve SUs in a given region or area, known as a 'cell' or 'site', by radio frequency (RF) communication. The SUs that are in direct communication with a particular fixed terminal are said to be served by the fixed terminal. In one example, all radio communications to and from each SU within the RAN are made via respective serving fixed terminals. Sites of neighboring fixed terminals may be offset from one another and may be non-overlapping or partially or fully overlapping with one another. In another example, SUs may communicate within a network without the assistance of one or more infrastructure equipment (e.g., base stations or repeaters), in a mode called direct mode. For example, in direct mode, SUs may transmit asynchronously and SUs s within range of the transmission synchronize themselves to that transmission for the purposes of receiving the transmission, but any transmissions in response to or after the first transmission are transmitted asynchronously.

RANs may operate according to any one of a number of available industry standard protocols such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the Terrestrial Trunked Radio (TETRA) standard defined by the European Telecommunication Standards Institute (ETSI), the Digital Private Mobile Radio (dPMR) standard also defined by the ETSI, or the Digital Mobile Radio (DMR) standard also defined by the ETSI. Because these systems generally provide lower throughput than the 3GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber units in RANs such as those set forth above send and receive audio and/or data (e.g., encoded voice, audio, video, control information, data, and/or audio/video streams) in accordance with the designated protocol.

OMA-PoC, in particular, enables familiar PTT and "instant on" features of traditional half duplex SUs, but uses SUs operating over modern cellular telecommunications networks. Using PoC, SUs such as mobile telephones and notebook computers can function as PTT half-duplex SUs for transmitting and receiving auditory data. Other types of PTT models and multimedia call models (MMCMs) are also available.

Floor control in an OMA-PoC session is generally maintained by a PTT server that controls communications between two or more SUs. When a user of one of the SUs keys a PTT button, a request for permission to speak in the OMA-PoC session is transmitted from the user's SU to the PTT server using, for example, a real-time transport protocol (RTP) message. If no other users are currently speaking in the PoC session, an acceptance message is transmitted back to the user's SU and the user can then speak into a microphone of the SU. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the received auditory data packets to other users of the PoC session (e.g., to other SUs in the group of SUs or talkgroup to which the user is subscribed), using for example a unicast, multicast, or broadcast communication technique.

Narrowband LMR systems, on the other hand, operate in either a conventional or trunked configuration. In either configuration, a plurality of SUs are partitioned into separate groups of SUs. In a conventional system, each SU in a group is selected to a particular frequency for communications associated with that SU's group. Thus, each group is served by one channel, and multiple groups may share the same single frequency (in which case, in some embodiments, group IDs may be present in the group data to distinguish between groups using the same shared frequency). Communications in a conventional system may take place via an infrastructure-provided repeater or repeaters, or directly via a direct mode (including talk-around) protocol.

In contrast, a trunked radio system and its SUs use a pool of traffic channels for virtually an unlimited number of groups of SUs (e.g., talkgroups). Thus, all groups are served by all channels. The trunked radio system works to take advantage of the probability that not all groups need a traffic channel for communication at the same time. When a member of a group requests a call on a control or rest channel on which all of the SUs in the system idle awaiting new call notifications, in one embodiment, a call controller assigns a separate traffic channel for the requested group call, and all group members move from the assigned control or rest channel to the assigned traffic channel for the group call. Communications then take place via the assigned traffic channel repeater. In another embodiment, when a member of a group requests a call on a control or rest channel, the call controller may convert the control or rest channel on which the SUs were idling to a traffic channel for the call, and instruct all SUs that are not participating in the new call to move to a newly assigned control or rest channel selected from the pool of available channels. With a given number of channels, a much greater number of groups can be accommodated in a trunked system as compared with conventional radio systems. In a trunked system, communications may also take place directly between SUs when operating in a talk-around mode (e.g. direct mode when infrastructure devices are also available).

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a radio controller, call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., SUs) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, SUs may dynamically affiliate with a group (and also disassociate with the group) perhaps based on user input, and the switching and/or radio network may track group membership and route new group calls according to the current group membership. In some instances, a group of SUs may be identified as a talkgroup, and a call initiated to members of that talkgroup (whether including the transmission of audio and/or data and/or video to a group of target SUs) may be identified as a talkgroup call.

One problem that has arisen with the use of talkgroups to distribute auditory or other data to member SUs is that a situation may arise where an incident occurs or a response is otherwise required at a defined location, and a responder may wish to dynamically create a location-based talkgroup relative to that defined location so that responding personnel may communicate with one another and coordinate a response between them. Existing methods of dynamically creating such a location-based talkgroup have relied upon pre-configured static distances from the defined location to determine which responding personnel (and corresponding SUs) should be included in the location-based talkgroup.

For example, as shown in FIG. 1, an incident/response area 100 may have a defined location 102 and may have a response boundary 104 statically defined at a fixed distance 106 from the defined location 102. Various potential responders (each of which may also already be a member of a corresponding incident response group, such as police, fire, or traffic control) may already be on scene or within the response boundary 104 at the time of the incident. Each potential responder may be a person or vehicle with an associated SU (e.g., portable or vehicular SU) capable of communicating wirelessly with each other and/or with a RAN 126. Such potential responding SUs may include, for example, first and second pedestrian responder SUs 112A and 112B (e.g., a traffic control officer operating on-foot), a motor vehicle responder SU 114A (e.g., police car), a motor vehicle responder SU 116A (e.g., fire engine), and a human-powered vehicle responder SU 118A (e.g., bicycle). Other potential responding SUs may fall within incident/response area 100 but outside of the response boundary 104, including for example, third pedestrian responder SU 112C, second and third motor vehicle responder SUs 114B and 114C, second motor vehicle responder SU 116B, and a human-powered vehicle responder SU 118B.

Each of the responder SUs may, in one example, already be actively using RF resources 128 of the RAN 126, which may be a LMR or LTE RAN providing coverage substantially throughout the incident/response area 100, illustrated in FIG. 1 as including a single fixed terminal 130 coupled to a controller 132 (e.g., radio controller, call controller, PTT server, zone controller, MME, BSC, MSC, site controller, Push-to-Talk controller, or other network device). As illustrated in FIG. 1, using the statically defined response boundary 104 to dynamically set a location-based group membership for an incident or response required at or near the defined location 102 may cause some potential responding SUs to be included in the location-based group that should not be, and on the other hand, may fail to include some potential responding SUs in the location-based group that should be. For example, in order to ensure that there is a sufficient number of police and fire motor vehicles included in the location-based group, the static response boundary 104 may be set at a relatively large distance 106 that incidentally includes pedestrian responder SUs 112B and 112C and human-powered vehicle responder SU 118B that could not possibly make it to the defined location 102 in a reasonable amount of time to provide aid or support in the response.

Accordingly, for this and other reasons, there is a need for an improved method and apparatus for dynamically forming location-based groups so that incident and other types of response groups can be created more efficiently and more effectively.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
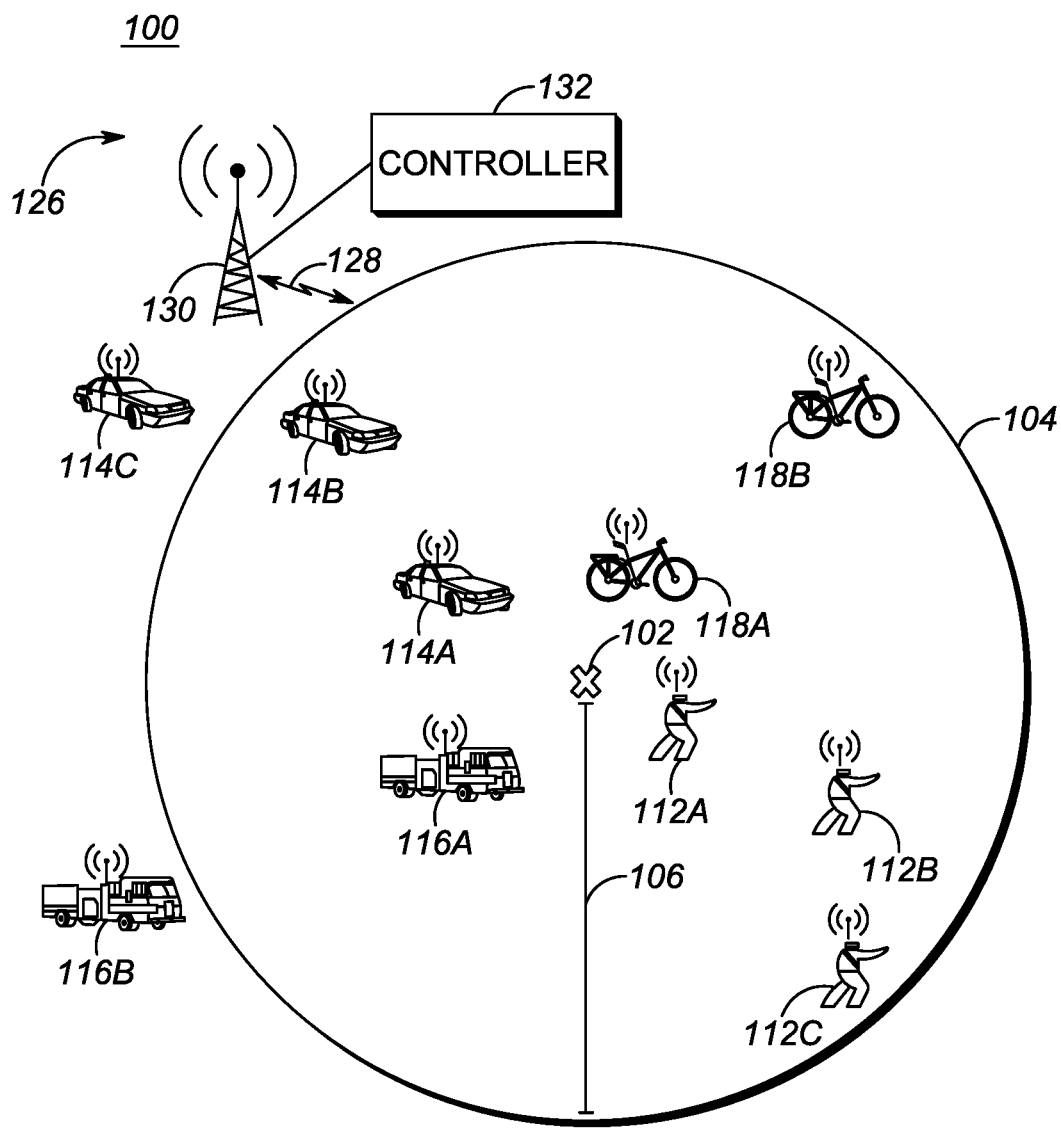
FIG. 1 is a schematic diagram of an existing incident/response area illustrating issues that may arise when using static distance parameters.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for dynamically forming location-based groups using variable distance parameters so that incident and other types of response groups can be created more efficiently and can collaborate and coordinate more effectively.

In one embodiment, a method of dynamic group formation using variable distance parameters in a wireless radio communication system comprising a plurality of subscriber units, includes: receiving, at a controller from one of a first subscriber unit and a dispatch console, a request for a new group call relative to a defined location; determining a current location of each of a plurality of potential responding second subscriber units; determining a maximum response distance associated with each of the second subscriber units, the maximum response distance determined at least as a function of a stored mode of transport associated with each of the second subscriber units; forming a group comprising second subscriber units having current locations that fall within the maximum response distance, relative to the defined location, associated with that second subscriber unit; and causing one or more of audio and data transmitted by the first subscriber unit to be provided to the second subscriber units in the formed group.

In another embodiment, a controller for dynamic group formation using variable distance parameters includes: a transceiver; a data store; and one or more processors configured to: receive, via the transceiver and from one of a first subscriber unit and a dispatch console, a request for a new group call relative to a defined location; determine a current location of each of a plurality of potential responding second subscriber units; determine a maximum response distance associated with each of the second subscriber units, the maximum response distance determined at least as a function of mode of transport associated with each of the second subscriber units stored in the data store; form a group comprising second subscriber units having current locations that fall within the maximum response distance, relative to the defined location, associated with that second subscriber unit; and cause, via the transceiver, one or more of audio and data transmitted by the first subscriber unit to be provided to the second subscriber units in the formed group.

Each of the above-mentioned embodiments will be discussed in more detail below, starting with example incident/response area schematic diagrams of areas in which the embodiments may be practiced, followed by an illustration of devices and processing steps for supporting dynamic location-based group formation using variable distance parameters from an infrastructure controller device perspective. Further advantages and features consistent with this disclosure will be set forth in the following detailed description, with reference to the figures.

1. EXAMPLE INCIDENT/RESPONSE AREA AND LOCATION-BASED GROUP MEMBERSHIP DETERMINATIONS

Figure 2:
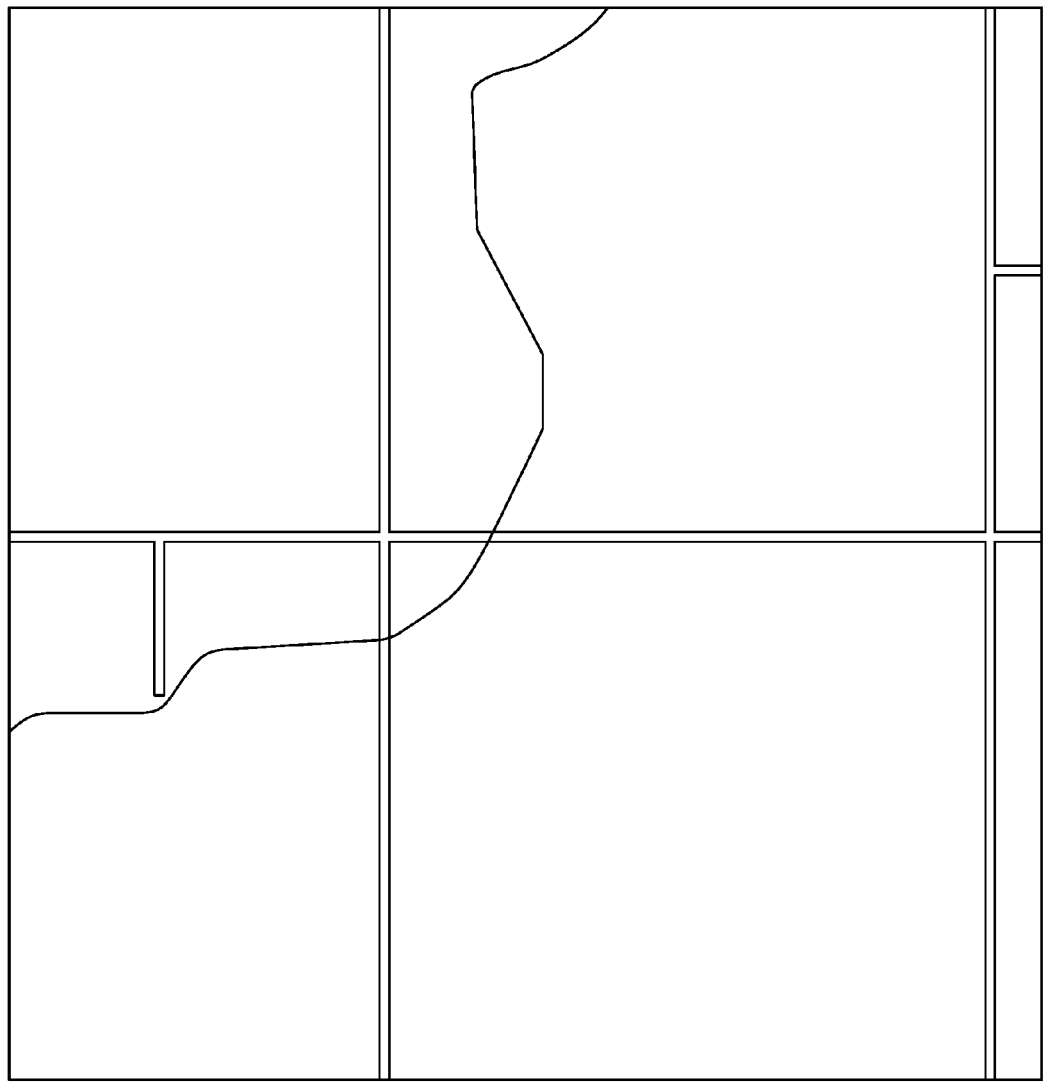
FIG. 2 is a plan view of a first example district in which disclosed embodiments may be practiced.
Figure 3:
FIG. 3 is a plan view of a second example district in which disclosed embodiments may be practiced.

FIGS. 2 and 3 illustrate different types of underlying districts in which disclosed embodiments may be practiced, and which may dynamically affect the variable distances used in dynamically forming location-based groups in accordance with some embodiments. For example, FIG. 2 is a cartographic plan view of a sparse district located in a country (e.g., sparse) environment, in which, for example, relatively few roads or obstacles are present, and in which most roads that are present run in straight lines for large portions of time and intersect with other roads only occasionally and usually in a perpendicular manner. In this type of district, responding SUs operating on-foot are at a distinct disadvantage, as they cannot cover nearly as much distance in responding to a location where an incident has occurred or a response is required as compared to a motor vehicle. Furthermore, in this type of district, motor vehicles can generally cover a lot of ground at higher speeds when compared to more urban districts.

FIG. 3, on the other hand, is a cartographic plan view of a dense district located in a city (e.g., dense) environment, in which a relatively larger number of roads are present and a greater number of obstacles, including commercial and pedestrian traffic, for example, may be present. Further, there are a much greater number and density of intersections in the district of FIG. 3 relative to the sparse district of FIG. 2, and such intersections may occur at varying acute or obtuse angles or may include some intersections of more than two roads at a time. In this type of dense district, responding SUs operating on-foot or on bike may be at a distinct advantage, as they can more easily avoid obstacles in the street and take shortcuts through alleys and buildings that may be not available to motor vehicles, for example. Furthermore, in such dense districts, motor vehicles can generally cover less ground and at lower speeds when compared to more sparse districts.

Of course, more than two types of districts may exist. For example, between a dense district and a sparse district, any number of additional intermediate districts may be defined, such as a suburban district that may fall in between dense and sparse districts. Other examples exist as well.

In light of these variances in types of districts and variances in the ability of first responders having different modes of transport to respond to a defined location, it has become clear that the implementation of a single static distance parameter in determining which responders to form into a location-based group is no longer ideal. Rather, the dynamic formation of location-based groups of SUs should take into account the mobility of responders (and their associated responding SU) with respect to the defined location.

Figure 4:
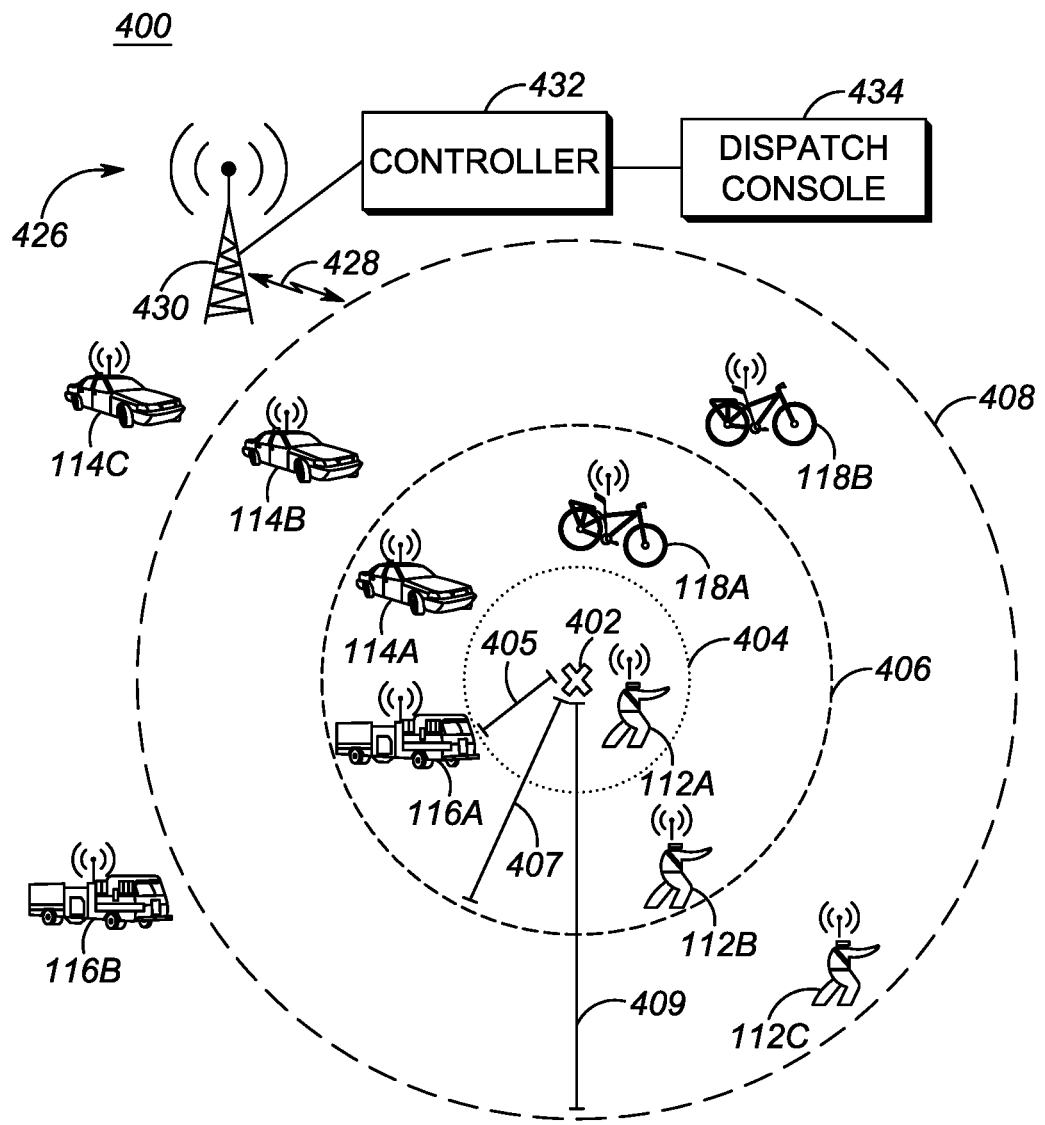
FIG. 4 is a schematic diagram of a first incident/response area overlaying the first example district of FIG. 2 illustrating dynamic location-based group formation using variable distance parameters in accordance with an embodiment.

FIG. 4, for example, illustrates a first example incident/response area 400 including a defined location 402 at which an incident has occurred or a response is otherwise required. The defined location 402 may be entered in or reported manually by a first responder on-scene (for example, pedestrian responding SU 112A in FIG. 4), could be automatically determined by a determined location of some other responding SU that is at the defined location 402 (not illustrated in FIG. 4), or could be set by a dispatcher at a dispatch console 434 communicatively coupled to the controller 432 (e.g., after receiving a report from a responding SU in the field or via some other mechanism, such as a plain old telephone (POT) system call received at the dispatch console 434). Incident/response area 400 is located in a sparse type district of FIG. 2. In this example, three different distances are used in determining which potential responding SUs to group into a location-based group for responding at the defined location 402, while one or two modes of transport are associated with each distance. Of course, in other example, more or fewer different distances could be implemented, and more or fewer modes of transport associated with each defined distance could be implemented.

In particular, a first perimeter 404 is defined at a distance 405 from the defined location 402, a second perimeter 406 is defined at a distance 407 from the defined location 402, and a third perimeter 408 is defined at a distance 409 from the defined location 402. While each of the perimeters 404, 406, 408 are illustrated as concentric circles centered on the defined location 402, in other examples, the perimeters may not be concentric (e.g., may be offset based on a defined meeting location for each type of responder or perhaps based on an entry location to a building or other type structure that may differ based on the type of responder), or may be based on some other form of cartographic definition, such as a set of three or more polygon vertices, where each polygon vertex is a GPS coordinate, such as a latitude and longitude pair, or some other form of cartographic definition, again having a center at the defined location or slightly offset from the defined location. Other examples are possible as well.

Each of the perimeters 404, 406, 408 and/or associated distances 405, 407, 409 is associated with one or more particular modes of transport available to a responding SU. For example, perimeter 404 and/or distance 405 may be associated with an on-foot mode of transport available to pedestrian responder SUs 112A, 112B, and 112C. Types of responders that could also be associated with the on-foot mode of transport and thus associated with perimeter 404 and/or distance 405 may include, for example, a beat officer, a traffic control officers, and a K-9 unit. Other examples are possible as well.

Perimeter 406 and/or distance 407 may be associated with a human-powered vehicular mode of transport, such as available to human-powered vehicle responder SUs 118A and 118B. Other types of responders that could be associated with the human-powered vehicular mode of transport and thus associated with perimeter 406 and/or distance 407 may include, for example, scooter responders. Other examples are possible as well.

Perimeter 408 and/or distance 409 may be associated with a motor vehicle mode of transport, such as available to police responder SUs 114A, 114B, 114C and/or fire engine responder SUs 116A, 116B. Other types of responders that could be associated with the motor vehicle mode of transport and thus associated with perimeter 408 and/or distance 409 may include, for example, motorcycle or Segway responders. Other examples are possible as well.

In addition, and although not illustrated in FIG. 4, further perimeters and/or distances may be provided and associated with other modes of transport, such as waterway transport (e.g., boats) or air-based transport (e.g., helicopters).

Radio access network (RAN) 426 provides wireless communications services to all potential responding SUs in the incident/response area 400 via fixed terminal 430 and wireless resource 428. The controller 432 in RAN 426 may include a mapping that maps each responder SU with a mode of transport with which it is currently associated. While controller 432 is illustrated in FIG. 4 as being within RAN 426, in other embodiments, controller 432 may be located outside of RAN 426 and accessible by RAN 426 via a separate wired or wireless communications interface.

The mode of transport with which a particular responder SU is associated may be manually configured by a network administrator, may be manually set or reported to controller 432 by a user via a user-interface provided at each responder SU, or may be automatically reported to the controller 432. In one embodiment, mode of transport could be automatically reported based on proximity sensors in one or both of the responder SUs and in a particular mode of transport, either of which may detect the responding SU's proximity to the particular mode of transport (e.g., such as a police car) and then report the association between the responder SU and particular mode of transport based on the detected proximity. In other embodiments, mode of transport may be determined analytically based on a type of responding SU being used by a responder or based on a detected instantaneous or average velocity of the responding SU. For example, portable user equipment such as mobile two-way radios carried by pedestrian police officers may have (partially or fully) unique identifiable radio IDs or manufacturer IDs that could be used to auto-populate a mode of transport associated with a particular responding SU. For example, a responding SU having a radio ID or manufacturer ID beginning with $AB_{16}$ may indicate that it is a mobile two-way radio carried by a pedestrian police officer, while some other pre-configured string may indicate that it is a vehicular radio associated with a motor vehicle.

Furthermore, a mode of transport may be determined via a detected instantaneous or average speed of a responding SU. For example, a detected instantaneous or average speed of a responding SU that falls within a pedestrian threshold speed of, for example, 0.5-3 MPH, and may be used to auto-populate a mode of transport as an on-foot mode of transport. In contrast, a detected instantaneous or average speed of a responding SU that falls within a motor vehicle threshold speed of, for example, 15-60 MPH may be used to auto-populate a mode of transport as a motor vehicle mode of transport. Speeds may be detected at each responder SU via an accelerometer and reported to the controller, or the controller (or some other infrastructure device) could calculate an instantaneous or average speed of a responding SU by calculating a passage of time between a plurality of periodic or intermittent location updates received from the responding SU. Other examples are possible as well.

Similarly, mode of transport may be determined via a detected altitude or a height relative to ground level of a responding SU. For example, a detected altitude or height above ground level of greater than 150 meters may be used to auto-populate a mode of transport as an air-based mode of transport, such as a helicopter or plane. A detected instantaneous or average speed of the responding SU could be used to differentiate between different air-based modes of transport. A detected altitude or height below ground level may be used to auto-populate a mode of transport as a pedestrian mode of transport, perhaps indicative of an office in a subway system or lower building level. Other examples are possible as well. Altitudes or heights above or below ground level may be detected at each responder SU via an altimeter or similar device and reported to the controller, or based on a network connect point to which the responder SU is attached that is known by the controller to be in a subterranean location. Other examples are possible as well.

A first example mode of transport mapping is set forth in Table I:

TABLE I

First Example Mode of Transport Mapping

| Responding SU (Identifier): | Mode of Transport: | Distance Criterion: |
|---|---|---|
| $AB5C_{16}$ | On-foot | 0.5 mi |
| $ABCD_{16}$ | On-foot | 0.5 mi |
| $ABBA_{16}$ | On-foot | 0.5 mi |
| $0123_{16}$ | Human-powered Vehicle | 1 mi |
| $4321_{16}$ | Human-powered Vehicle | 1 mi |
| $FFFF_{16}$ | Motor Vehicle | 5 mi |
| $EFEF_{16}$ | Motor Vehicle | 5 mi |
| $BCBB_{16}$ | Motor Vehicle | 5 mi |
| $5656_{16}$ | Motor Vehicle | 5 mi |
| $9898_{16}$ | Motor Vehicle | 5 mi |

In the first example set forth in Table I, a first column may list each responding SU's unique identifier associated with potential responding SUs operating in the incident/response area 400. The on-foot responders in Table I having SU identifiers $AB5C_{16}$, $ABCD_{16}$, and $ABBA_{16}$ may be associated with potential responding SUs 112A, 112B, and 112C of FIG. 4. The motor vehicle responders in Table I having SU identifiers $FFFF_{16}$, $EFEF_{16}$, and $BCBB_{16}$ may be associated with potential responding SUs 114A, 114B, and 114C of FIG. 4. The motor vehicle responders having SU identifiers $5656_{16}$ and $9898_{16}$ may be associated with potential responding SUs 116A and 116B of FIG. 4. The human-powered vehicle responders having SU identifiers $0123_{16}$ and $4321_{16}$ may be associated with potential responding SUs 118A and 118B of FIG. 4. The on-foot mode of transport in Table I may be equivalent to distance 405 of FIG. 4 and associated with a distance criterion of 0.5 miles, the human-powered vehicle mode of transport in Table I may be equivalent to distance 407 of FIG. 4 and associated with a distance criterion of 1 mile, and the motor vehicle mode of transport in Table I may be equivalent to distance 409 of FIG. 4 and associated with a distance criterion of 5 miles.

The responding SU identifier in Table I may be an International Mobile Subscriber Identity (IMSI)) which may be connected to a physical media (such as a Subscriber Identity Module (SIM) card), a hardware radio medium access control address (MAC), an internet protocol (IP) address, or some other form of value capable of uniquely identifying individual responding SUs. The mode of transport may be a textual description of the current mode of transport available to the responding personnel associated with the responding SU, as shown, or could be some other value such as an index number associated with a particular mode of transport. The distance criterion is set as a function of the mode of transport, and in some embodiments, may vary based on the determined type of district in which a defined location is located. For example, Table I may list distance criterions for a sparse district type, and such criterions may vary for other types of districts in which the defined location is determined to be located. In some embodiments, the mode of transport may be changeable or updateable via proximity sensors or some other mechanism, as noted above.

Furthermore, the distance criterion associated with any particular type of mode of transport may be updateable based on other detected conditions. For example, the controller 432 may access traffic conditions via a traffic server and modify the distance criterion for the motor vehicle mode of transport up or down based on a respectively higher or lower detected amount of traffic within a particular incident/response area 400. Additionally or alternatively, the controller 432 may access weather conditions via a weather server and modify the distance criterions up or down for one or more of motor vehicles, human-powered-vehicles, on-foot responders, or water-based vehicles based on the weather conditions retrieved from the weather server that may positively or negatively affect a particular mode of transport. For example, poorer weather may cause distance criterions to shrink while good weather may cause distance criterions to increase for some or all modes of transport.

A determined time of day, determined at the controller or via an external time server device, may also cause distance criterions to vary (e.g., increased during the day and decreased at night, for example) for some modes of transport. Other examples are possible as well.

While the mapping illustrated in Table I above may be stored at the controller, in other embodiments, the mapping may also be stored remote from controller and accessible to controller via one or more internal or external networks relative to the RAN.

Controller 432 may also store, or have access to, current location information for each of the potential responding SUs set forth in Table I above. Current location information may be determined by each responding SU independently using a Global Navigation Satellite System receiver such as a GPS receiver or using a trilateration technique via signals received from a plurality of ground-based fixed terminals and then reported to a location server (at the controller 432 or elsewhere internal or external to the RAN) on a regular or intermittent schedule. Additionally or alternatively, an infrastructure-based location determination may be implemented using same or similar trilateration techniques via signals received from the potential responding SU at a plurality of ground-based fixed terminals. Other possibilities exist as well.

Given the locations illustrated in FIG. 4 and the distance criterions of Table I, a location-based group using the variable distance parameters of Table I relative to the defined location 402 would result in a group consisting of pedestrian responding SU 112A having an on-foot distance criterion falling within perimeter 404 and/or distance 405, bicycle responding SU 118A having a human-powered vehicle distance criterion falling within perimeter 406 and/or distance 407, and fire truck and police car responding SUs 114A, 114B, and 116A having a motor vehicle distance criterion falling within perimeter 408 and/or distance 409. Advantageously, and in contrast to FIG. 1, by using variable-distance parameters in forming a location-based group, responding SUs that have no ability to respond to a defined location in a timely fashion, such as bicycle potential responding SU 118B and pedestrian potential responding SUs 112B and 112C can be excluded from the location-based group, while farther away motor vehicles that are capable of responding to the defined location in a timely fashion, such as police car potential responding SU 114B can still be included in the location-based group.

In FIG. 4, the wireless resource 428 may be, for example, one or more wireless links supporting a standard or protocol such as GPRS or UMTS, 2G (e.g. GSM), 3G (e.g. WCDMA or Long Term Evolution (LTE)), 4G (WiMAX or LTE), iDEN, wireless LAN (WLAN), ETSI Digital Mobile Radio (DMR), Project 25 (P25) standard defined by the Association of Public Safety Communications Officials International (APCO), Terrestrial Trunked Radio (TETRA), or other radio protocols or standards.

Each potential responder SU may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture provided via RAN 426 allows a single responding SU, such as responding SU 112A, to communicate with one or more members (such as responding SUs 114A, 114B, 116A, and 118A) associated with a dynamically formed location-based group at the same time.

Although only one controller 432, one fixed terminal 430, and one wireless resource 428 is illustrated in FIG. 4, the present disclosure is not limited as such, and more controllers, more fixed terminals, and more wireless resources could be used in any particular implementation. Furthermore, while a single controller 432 is illustrated in FIG. 4, a distributed controller may be used that divides functions across multiple devices, perhaps for load balancing reasons. Controller 432 may additionally function as a call controller, PTT server, zone controller, mobile management entity (MME), base station controller (BSC), mobile switching center (MSC), site controller, Push-to-Talk controller, or other network device for aiding in the control and/or distribution of group auditory data or other types of group communications amongst responding SUs. Finally, and although not illustrated in FIG. 4, RAN 426 may further comprise one or more additional routers, switches, LANs, WLANs, WANs, access points, or other network infrastructure.

External networks (not shown) may also be accessible to potential responding SUs via RAN 426. External networks may include, for example, a public switched telephone network (PSTN), a plain old telephone (POT) system, the Internet, or another wireless service provider's network, among other possibilities.

Dispatch console 434 may be directly coupled to controller 432, as shown, or may be indirectly coupled to controller 432 via one or more internal or externals networks. The dispatch console 434 allows an administrator or dispatcher at a dispatch console to initiate infrastructure-sourced dynamic location-based group communications to groups of responding SUs relative to a defined location indicated by the dispatcher, among other features and functions.

Figure 5:
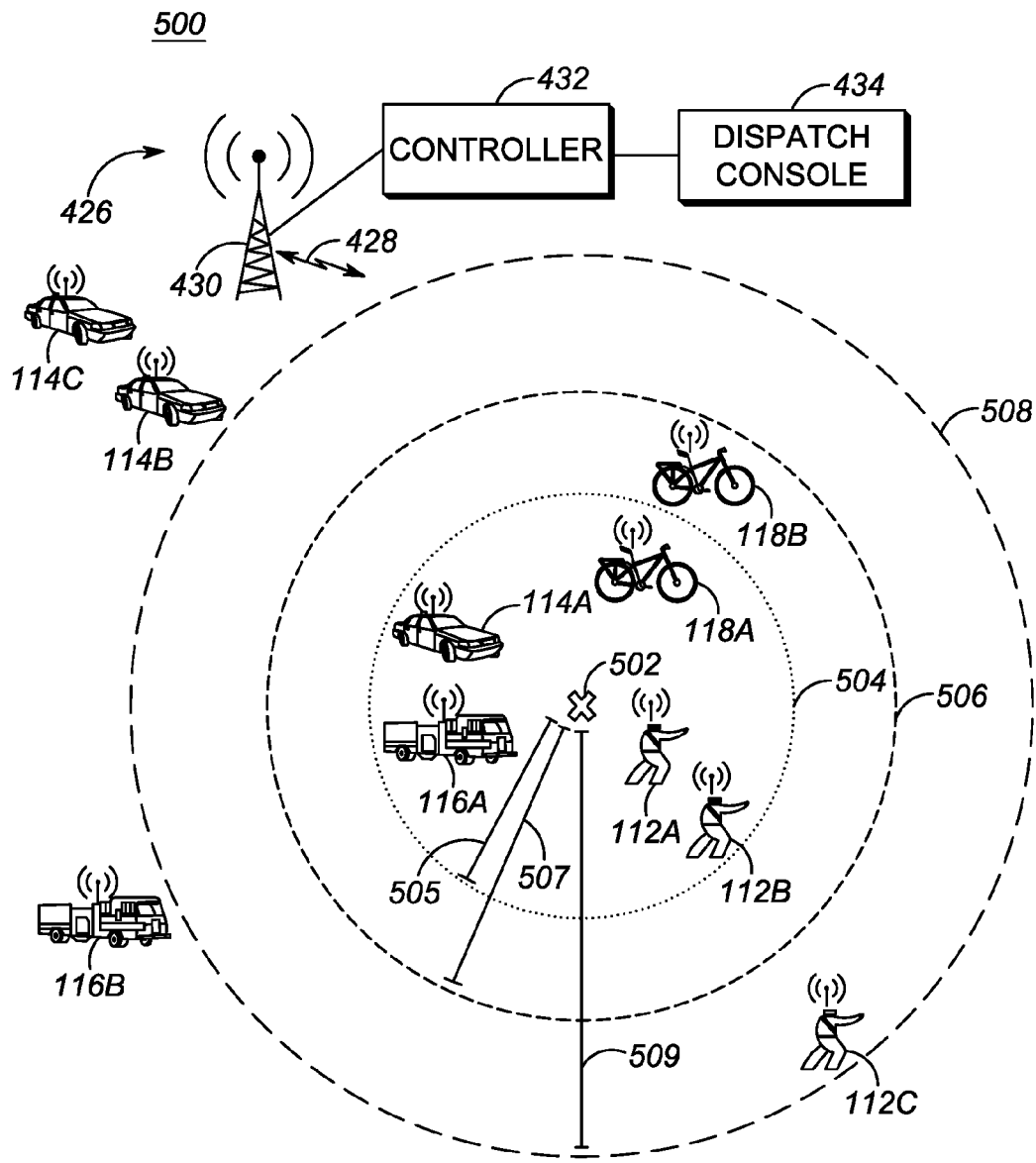
FIG. 5 is a schematic diagram of a second incident/response area overlaying the second example district of FIG. 3 illustrating dynamic location-based group formation using variable distance parameters in accordance with an embodiment.

FIG. 5 illustrates a second example incident scene occurring at a defined location 502 within the incident/response area 500. Several reference characters used in FIG. 5 are the same as those used in as in FIG. 4, and their description is not repeated here. The defined location 502 in FIG. 5 may be entered in or reported manually by a first responder on scene (for example, responding SU 112A), could be automatically determined by the location of another responding SU at the defined location 502 (not illustrated in FIG. 5), or could be set by a dispatcher at the dispatch console 434 communicatively coupled to the controller 432. In contrast to FIG. 4, incident/response area 500 is located in a dense district such as that illustrated in FIG. 3. In this example, and similar to FIG. 4, three different distances are used in determining which responding SUs to group into a responding group for responding at the defined location 502, and one or two modes of transport are associated with each distance.

In particular, a first perimeter 504 is defined at a distance 505 from the defined location 502, a second perimeter 506 is defined at a distance 507 from the defined location 502, and a third perimeter 508 is defined at a distance 509 from the defined location 502. As in FIG. 4, the shapes, values, and center locations of the distances and perimeters in FIG. 5 are exemplary in nature only.

Each of the perimeters 504, 506, 508 and/or associated distances 505, 507, 509 is associated with one or more particular modes of transport available to potential responding SUs in incident/response area 500.

A second example mode of transport mapping is set forth in Table II:

TABLE II

Second Example Mode of Transport Mapping

| Responding SU (Identifier): | Mode of Transport: | Distance Criterion: |
|---|---|---|
| $AB5C_{16}$ | On-foot | 0.75 mi |
| $ABCD_{16}$ | On-foot | 0.75 mi |
| $ABBA_{16}$ | On-foot | 0.75 mi |
| $0123_{16}$ | Human-powered Vehicle | 1.25 mi |
| $4321_{16}$ | Human-powered Vehicle | 1.25 mi |
| $FFFF_{16}$ | Motor Vehicle | 3 mi |
| $EFEF_{16}$ | Motor Vehicle | 3 mi |
| $BCBB_{16}$ | Motor Vehicle | 3 mi |
| $5656_{16}$ | Motor Vehicle | 3 mi |
| $9898_{16}$ | Motor Vehicle | 3 mi |

In the second example set forth in Table II, a first column may list each responding SU identifier representing a potential responder operating in the incident/response area 500. In this example, the mapping between SU identifiers in the first column of Table II and reference characters in FIG. 5 is the same as that set forth above with respect to FIG. 4. However, as the underlying type of district in which the defined location is located has changed from a sparse district in FIG. 4 to a dense district in FIG. 5, the distance criterions associated with each mode of transport has been modified accordingly. For example, the on-foot mode of transport may be equivalent to distance 505 of FIG. 5 and associated with a distance criterion of 0.75 miles, the human-powered vehicle mode of transport may be equivalent to distance 507 of FIG. 5 and associated with a distance criterion of 1.25 mile, and the motor vehicle mode of transport may be equivalent to distance 509 of FIG. 5 and associated with a distance criterion of 3 miles. The distance criterions may be modified for one or more of the reasons already set forth above with respect to FIGS. 2 and 3, among other possibilities.

The controller 432 may be configured to, in response to receiving an indication of a defined location, determine whether the area surrounding the defined location is associated with a sparse district, a dense district, or some other type of district. In one embodiment, the controller 432 may maintain or access a cartographic information system (CIS) that is pre-configured with areas or zones designated as being a particular type of district. In other embodiments, the controller 432 may be pre-configured to always use a particular type of district. Still further, the type of district may be indicated by the responding SU or dispatcher requesting the location-based group.

Once the type of district is known, the controller 432 can then associate a corresponding distance criterion with each mode of transport as a function of the type of district in which the defined location is located.

Given the locations illustrated in FIG. 5 and the distance criterions of Table II, a location-based group using the variable distance parameters of Table II relative to the defined location 502 would result in a group consisting of pedestrian responding SUs 112A and 112B having an on-foot distance criterion falling within perimeter 504 and/or distance 505, bicycle responding SUs 118A and 118B having a human-powered vehicle distance criterion falling within perimeter 506 and/or distance 507, and fire truck and police car responding SUs 114A and 116A having a motor vehicle distance criterion falling within perimeter 508 and/or distance 509. Advantageously, and in contrast to FIG. 1, by using variable-distance parameters in forming a location-based group, responding SUs that have no ability to respond to the defined location in a timely fashion, such as motor vehicle potential responding SU 114B and pedestrian potential responding SU 112C can be excluded from the location-based group.

2. EXAMPLE CONTROLLER FOR CREATING DYNAMIC LOCATION-BASED GROUPS USING VARIABLE DISTANCE PARAMETERS

Figure 6:
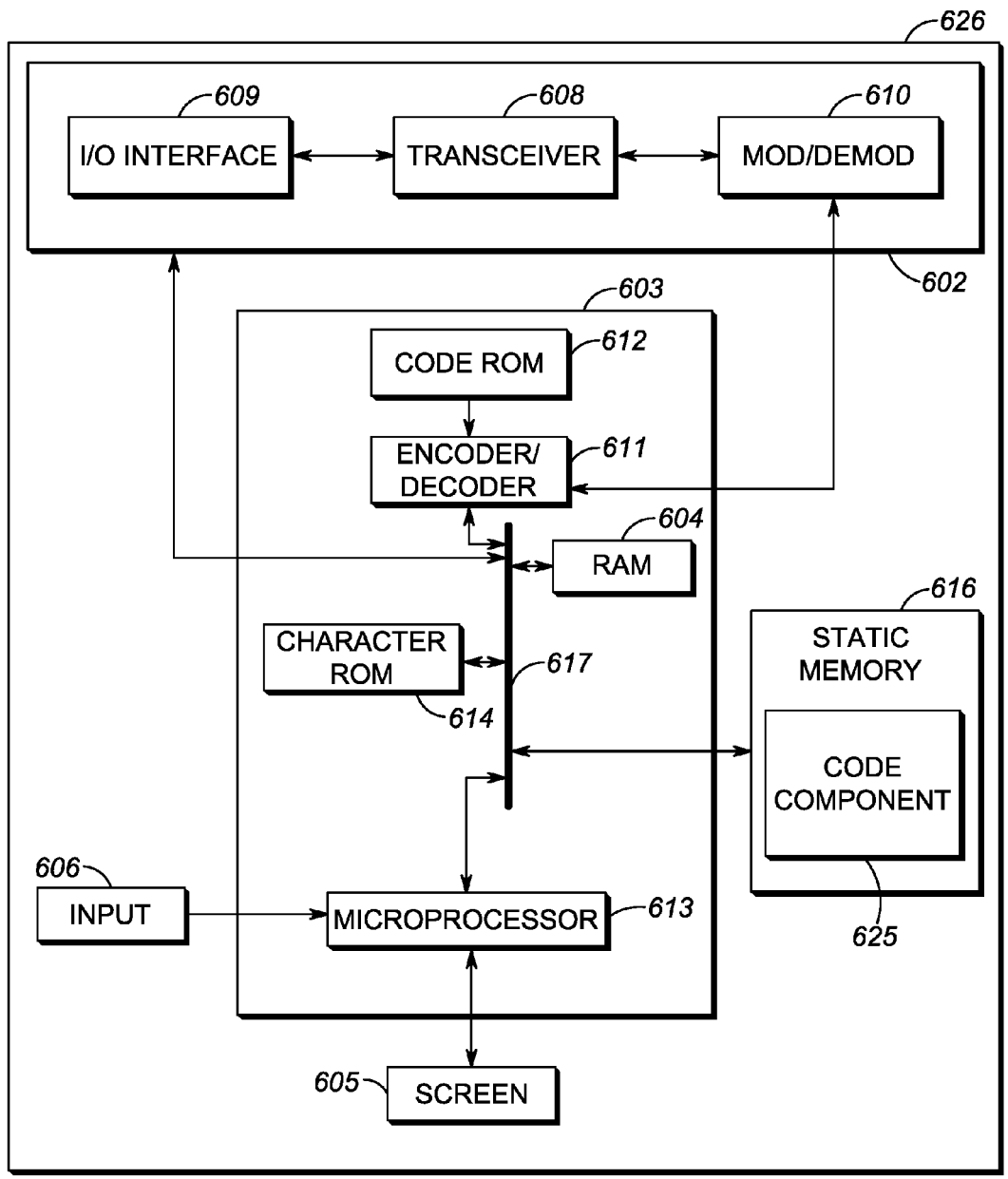
FIG. 6 is a block diagram of a controller device capable of dynamically forming location-based groups using variable distance parameters in accordance with an embodiment.

Referring to FIG. 6, a block diagram illustrates a controller 626, that may be the same or similar to controller 432, that may be used in accordance with some embodiments for creating dynamic location-based groups using variable distance parameters. The controller 626 includes a communications unit 602 coupled to a common data and address bus 617 of a processing unit 603. The controller 626 may also include an input unit (e.g., keypad, pointing device, etc.) 606 and a display screen 605, each coupled to be in communication with the processing unit 603.

The processing unit 603 may include an encoder/decoder 611 with an associated code ROM 612 for storing data for encoding and decoding voice, data, control, or other signals that may be transmitted or received by the controller 626. The processing unit 603 may further include a microprocessor 613 coupled, by the common data and address bus 617, to the encoder/decoder 611, a character ROM 614, a RAM 604, and a static memory 616. The processing unit 603 may also have access, via one or both of RAM 604 and static memory 616 or via I/O interface 609, to (i) mode of transport mappings that map responding SU IDs to one of a plurality of different associated modes of transport, (ii) distance criterion mappings that, for each mode of transport, set forth a corresponding distance criterion that may or may not depend upon an underlying type of district in which a defined location occurs, (iii) traffic condition information, (iv) weather information, and/or (v) current location information for each responding SU in the incident/response area associated with the controller 626.

The communications unit 602 may include the I/O interface 609 configurable to communicate with network components (for example, fixed terminals, call controllers, databases, or dispatch consoles, among other possibilities), and other user equipment (for example, responding SUs) communicatively coupled to the controller 626 via wireless resources. The communications unit 602 may include one or more broadband and/or narrowband transceivers 608, such as a LTE transceiver, a 3G transceiver, an APCO P25 transceiver, a DMR transceiver, a TETRA transceiver, a WiMAX transceiver, and/or other similar type of wireless transceiver configurable to communicate via a wireless network for infrastructure communications. Additionally or alternatively, the communications unit 602 may include one or more local area network or personal area network transceivers 608 such as a Wi-Fi transceiver perhaps operating in accordance with an IEEE 802.11 standard (e.g., 802.11a, 802.11b, 802.11g), or a Bluetooth transceiver, for SD to SD communications. Additionally or alternatively, the communications unit 602 may include one or more wire-line transceivers 608, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 610 that is coupled to the encoder/decoder 611. The character ROM 614 stores code for decoding or encoding data such as control, request, or instruction messages, audio and/or data that may be transmitted or received by the controller 626. Static memory 616 may store operating code that, when executed by microprocessor 613, causes the controller 626 to perform one or more of the processing steps and/or message transmissions and/or receptions set forth in FIG. 7.

3. PROCESS FOR CREATING DYNAMIC LOCATION-BASED GROUPS USING VARIABLE DISTANCE PARAMETERS

Figure 7:
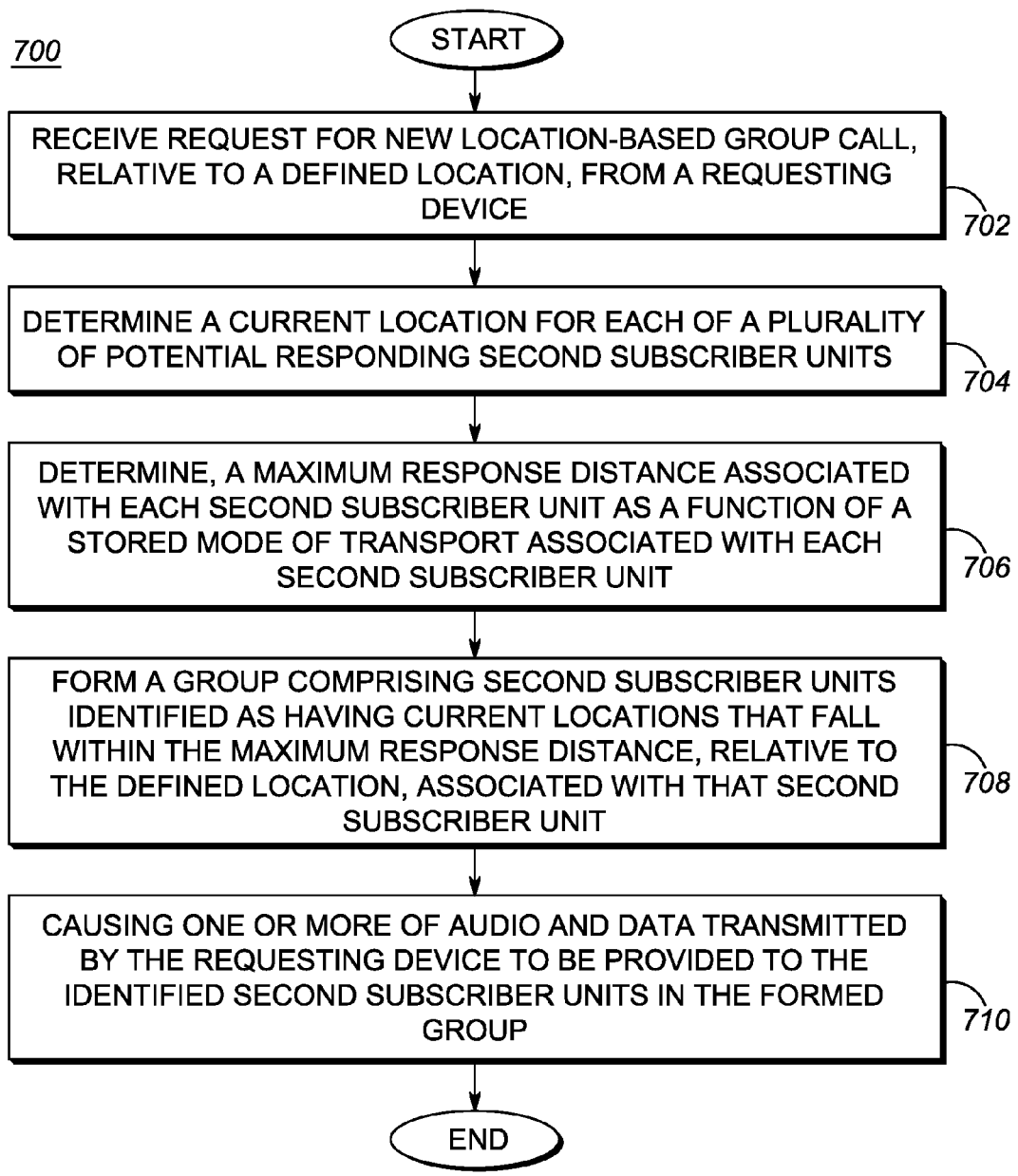
FIG. 7 is a flow chart illustrating processing steps executable at the controller device of FIG. 6 for dynamically forming location-based groups using variable distance parameters in accordance with an embodiment.

FIG. 7 includes a flow chart illustrating a process 700 including processing steps executable at the controller device 626 of FIG. 6 and/or controller device 432 of FIG. 4 for creating location-based groups using variable distance parameters in accordance with an embodiment. Of course, additional steps, receptions, and/or transmissions not disclosed herein could be additionally added before, after, or in-between steps, receptions, and/or transmissions disclosed in FIG. 7, and the presence of such additional steps, receptions, and/or transmissions would not negate the purpose and advantages of the examples set forth in detail throughout the remainder of this disclosure.

At step 702, a controller in a RAN receives a request for a new location-based group call relative to a defined location from a requesting device (e.g., one of a first responding SU and a dispatch console). The defined location may be received in a same packet, instruction, header, or embedded control signal as the new group call request, or may be sent in a separate packet, instruction, header, or embedded control signal. The defined location may be a same location as the requesting device (e.g., first responding SU), may be a location manually entered by an operator of the requesting device (e.g., first responding SU or dispatch console), or may be some defined location automatically determined by the controller, perhaps with aid from other components within the RAN or outside of the RAN. The defined location may be comprised of, for example, GPS coordinates or other form of latitude and longitude coordinates. In other embodiments, Cartesian or polar coordinate systems could be used instead or in addition.

At step 704, the controller determines a current location for each of a plurality of potential responding second SUs. The plurality of potential responding second SUs may be all second SUs active and/or known to the controller, a subset of all second subscriber units active and/or known to the controller including currently registered with one or more RANs providing wireless service at the defined location or in a threshold maximum region surrounding the defined location such as 1-5 miles, a subset of all second SUs active and/or known to the controller including only those that are not already active in another call or otherwise determined to be busy, for example, or a subset of all second SUs active and/or known to the controller that are particularly identified as available for participating in dynamically created location-based talkgroups, among other possibilities.

In one embodiment, the current location of each of the second SUs may be requested in response to receiving the request for a new location-based group call. This may include, for example, causing requests for current location information to be transmitted to each of the second SUs and subsequently receiving, in response, current location information from each of the second SUs.

Additionally or alternatively, the second SUs may periodically or intermittently provide their current location to the controller or some other device within or outside of the RAN, and the controller may retrieve, internally or via a transmitted request to an external device, the most recent location information provided via the periodic or intermittent updates.

Still further, the RAN itself may periodically determine, via a plurality of fixed networks, current location information for each of the second SUs, and provide or make such location information available to the controller. Other possibilities exist as well.

At step 706, the controller determines a maximum response distance associated with each second SU as a function of a stored mode of transport associated with each second SU. Mode of transport information may be obtained via a SU ID to mode of transport mapping stored at the controller or made available to the controller at some other device located within the RAN or external to the RAN. Once the mode of transport information is retrieved for each of the second SUs, maximum distance criterions for each mode of transport identified in the mode of transport information can be retrieved from a mode of transport to distance criterion mapping stored at the controller itself or made available to the controller at a separate device internal to the RAN or external to the RAN. In some embodiments, updates to a mode of transport may be received from a particular second SU that changes a mode of transport associated with the particular second SU from one mode of transport to another different mode of transport. The controller may responsively update the mapping at the controller itself or cause an update to be made at some other device located within the RAN or external to the RAN that stores the SU ID to mode of transport mapping for the particular second SU.

Separate mode of transport to distance criterion mappings may be provided as a function of a type of district in which the defined location is located. The type of district may be determined by the controller via a CIS stored at the controller itself of made accessible to the controller via a communications interface. In other embodiments, the type of district may be defined in the request in step 702 or via a separate message from the requesting device.

At step 708, the controller forms a group (e.g., a talkgroup) comprising those ones of the second SUs identified as having a current location that falls within the maximum response distance for the mode of transport associated with each second SU, relative to the defined location received in step 702. Forming a talkgroup may include, for example, assigning a unique talkgroup ID to the identified second SUs. The unique talkgroup ID may be stored at the controller, reported to a separate PTT server within or external to the same RAN as the controller, reported to the requesting device, and/or reported to the identified second SUs. The unique talkgroup ID may be a reserved talkgroup ID that is reserved for dynamic location-based talkgroups, or may be a randomly generated talkgroup ID that is determined to not already be in use by other SUs in the RAN. In other embodiments, forming a talkgroup may include assigning a particular conventional or trunked traffic channel for the call, or direct mode channel or talk-around channel for the call, and informing the requesting device and/or identified second SUs of the channel or channels assigned for the call. Other possibilities exist as well.

At step 710, the controller causes one or more of audio and data transmitted by the requesting device to be provided to the identified second SUs in the formed group. In one example, the controller itself or a PTT server associated with the controller may receive audio and/or data from the requesting device destined for the identified second SUs, and may then forward, via one or more unicast, multicast, or broadcast transmissions, the received audio and/or data to the identified second SUs in the formed group. In another example, the controller may assign a particular repeater (conventional or trunked) or pair of repeaters to a frequency (or pair of frequencies) assigned to the formed group, such that the subsequent audio and/or data transmitted by the requesting device and received at the particular repeater (or one of the pair of particular repeaters) is subsequently repeated by the particular repeater (or other of the pair of particular repeaters) for receipt by the identified second SUs in the formed group. In a still further example, the subsequent audio and/or data may be provided directly from the requesting device (e.g., first responding SU) to the identified second SUs via a direct mode transmission by the requesting device on an assigned direct mode or talk-around channel, perhaps using an assigned talkgroup identifier assigned by the controller. Finally, audio and/or data may be provided by the requesting device (e.g., the dispatch console) and routed, via the controller itself or via another device in the RAN under direction of the controller, to the identified second SUs in the formed group via one or more repeaters assigned to the dispatch console-sourced call. Other possibilities exist as well.

4. CONCLUSION

In accordance with the foregoing, an improved method and apparatus for dynamically forming location-based group using variable distance parameters is disclosed, allowing incident and emergency response groups to be created more efficiently and more effectively when responding to an incident or emergency at a particular geographic location.

As a result, a more intuitive, useful, and efficient group communications system can be provided, improving communication capabilities of incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of dynamic location-based group formation using variable distance parameters in a wireless radio communication system comprising a plurality of subscriber units having various different modes of transport, the method comprising:
   receiving, at a controller from one of a first subscriber unit and a dispatch console, a request for a new group call relative to a defined location;
   determining a current location of each of a plurality of potential responding second subscriber units, at least two of which have different modes of transport;
   retrieving, by the controller from a first data store, mode of transport information identifying a particular mode of transport, out of a plurality of possible modes of transport, associated with each of the plurality of potential responding second subscriber units;
   retrieving, by the controller from a second data store, a mode of transport to distance criterion mapping that sets forth a maximum distance criterion for each of the plurality of possible modes of transport set forth in the mode of transport information;
   identifying, by the controller, those second subscriber units out of the plurality of second subscriber units having the respective determined current location within the retrieved maximum distance criterion for the identified particular mode of transport associated with each second subscriber unit relative to the defined location;
   forming a group comprising the identified second subscriber units; and
   causing one or more of audio and data transmitted by the one of the first subscriber unit and the dispatch console to be provided to the second subscriber units in the formed group.

2. The method of claim 1, further comprising assigning a group identifier to the formed group, and providing the group identifier to the one of the first subscriber unit and the dispatch console.

3. The method of claim 2, further comprising providing the group identifier to all second subscriber units in the formed group.

4. The method of claim 3, wherein causing the one or more of audio and data transmitted by the one of the first subscriber unit and the dispatch console to be provided to the second subscriber units in the formed group comprises the first subscriber unit transmitting the one or more of audio and data with the group identifier, the second subscriber units directly receiving the one or more of audio and data transmitted by the first subscriber unit, and the second subscriber units playing back the received one or more of audio and data.

5. The method of claim 1, wherein causing the one or more of audio and data transmitted by the one of the first subscriber unit and the dispatch console to be provided to the second subscriber units in the formed group comprises receiving the one or more of audio and data transmitted by the one of the first subscriber unit and the dispatch console at one of a push-to-talk (PTT) server and a repeater, and forwarding, via the one of the PTT server and the repeater, the one or more of audio and data transmitted by the first subscriber unit and the dispatch console to the second subscriber units in the formed group.

6. The method of claim 1, wherein the request for the group call is received from the dispatch console, and the defined location is determined based on a current location of the first subscriber unit.

7. The method of claim 6, wherein the current location of the first subscriber unit is determined by the first subscriber unit and provided to the controller or is separately provided to the controller via a separate location server device.

8. The method of claim 1, wherein the defined location is specified in the request and is different from the current location of the first subscriber unit.

9. The method of claim 1, each maximum distance criterion for each of the plurality of possible modes of transport set forth in the mode of transport information further varies as a function of a type of district in which the defined location is located, the type of district including at least one of city and country.

10. The method of claim 9, wherein the maximum distance criterions for some modes of transport are larger in the city district than the country district, while the maximum distance criterions for other modes of transport are smaller in the city district than in the country district.

11. The method of claim 9, the method further comprising identifying the type of district via a geographic information system (GIS) based on the defined location or via the request itself.

12. The method of claim 1, wherein the plurality of modes of transport include at least on-foot mode of transport and ground-based vehicular mode of transport.

13. The method of claim 12, wherein the plurality of modes of transport further include human-powered mode of transport, waterway mode of transport, and air-based mode of transport.

14. The method of claim 13, wherein:
human-powered mode of transport includes at least bicycles and scooters;
ground-based vehicular mode of transport includes at least cars and motorcycles;
air-based mode of transport includes at least helicopters; and
waterway mode of transport includes at least boats.

15. The method of claim 1, wherein the mode of transport information is stored at the data store at the controller.

16. The method of claim 1, further comprising receiving a notification of a changed mode of transport associated with a third subscriber unit, and updating the mode of transport information to reflect the third subscriber unit as associated with the changed mode of transport indicated in the notification and subsequently correspondingly updating the maximum distance criterion for the third subscriber unit as a function of the changed mode of transport.

17. The method of claim 1, wherein the maximum distance criterion for each mode of transport in the mode of transport to distance criterion mapping further varies as a function of one or more of current traffic information, current weather condition information, and time of day information.

18. The method of claim 1, wherein the defined location is an incident location associated with an emergency event.

19. A controller for dynamic location-based group formation using variable distance parameters, the controller comprising:
a transceiver;
and
one or more processors configured to:
receive, via the transceiver and from one of a first subscriber unit and a dispatch console, a request for a new group call relative to a defined location;
determine a current location of each of a plurality of potential responding second subscriber units, at least two of which have different modes of transport;
retrieve, from a first data store, mode of transport information identifying a particular mode of transport, out of a plurality of possible modes of transport, associated with each of the plurality of potential responding second subscriber units;
retrieve, from a second data store, a mode of transport to distance criterion mapping that sets forth a maximum distance criterion for each of the plurality of possible modes of transport set forth in the mode of transport information;
identify those second subscriber units out of the plurality of second subscriber units having the respective determined current location within the retrieved maximum distance criterion for the identified particular mode of transport associated with each second subscriber unit relative to the defined location;
form a group comprising the identified second subscriber units; and
cause, via the transceiver, one or more of audio and data transmitted by the one of the first subscriber unit and the dispatch console to be provided to the second subscriber units in the formed group.

20. The controller of claim 19, wherein the one or more processors are further configured to:
assign a group identifier to the formed group; and
provide, via the transceiver, the group identifier to one or both of (i) the one of the first subscriber unit and the dispatch console and (ii) all second subscriber units in the formed group.

* * * * *